United States Patent [19]
Glumac

[15] 3,737,061
[45] June 5, 1973

[54] STORAGE UNIT AND TRAILER BODY COMBINATION

[76] Inventor: Nick P. Glumac, Rural Route 2, Box 386, Chesterton, Ind. 46304

[22] Filed: Oct. 21, 1970

[21] Appl. No.: 82,583

[52] U.S. Cl.................................214/512, 214/515
[51] Int. Cl............................B60p 1/02, B60p 1/64
[58] Field of Search .........214/512, 515; 254/122, 45

[56] References Cited
UNITED STATES PATENTS

| | | | |
|---|---|---|---|
| 2,676,783 | 4/1954 | Rogers | 214/512 X |
| 2,596,838 | 5/1952 | Carver et al. | 214/515 X |
| 3,362,552 | 1/1968 | Thiele | 214/515 X |
| 3,119,503 | 1/1964 | Herpich et al. | 214/515 X |
| 2,670,866 | 3/1954 | Glesby | 214/515 X |

Primary Examiner—Albert J. Makay
Attorney—Pennie, Edmonds, Morton, Taylor and Adams

[57] ABSTRACT

There is disclosed a unique truck trailer body having liftable features and a removable storage unit for transport thereby.

2 Claims, 14 Drawing Figures

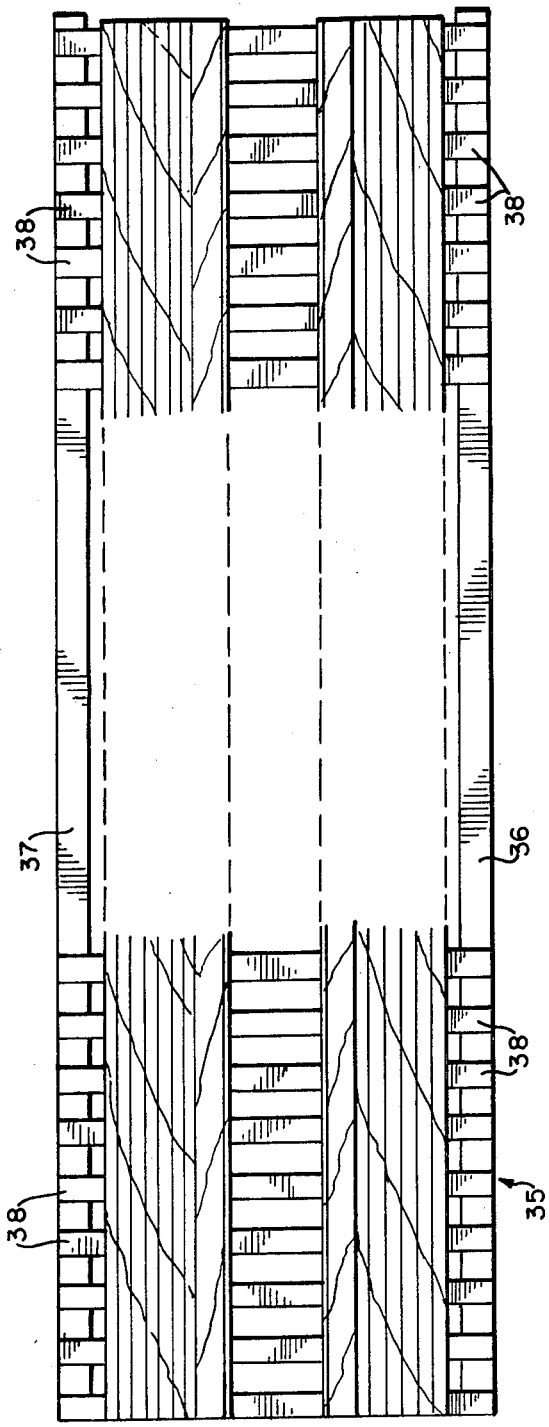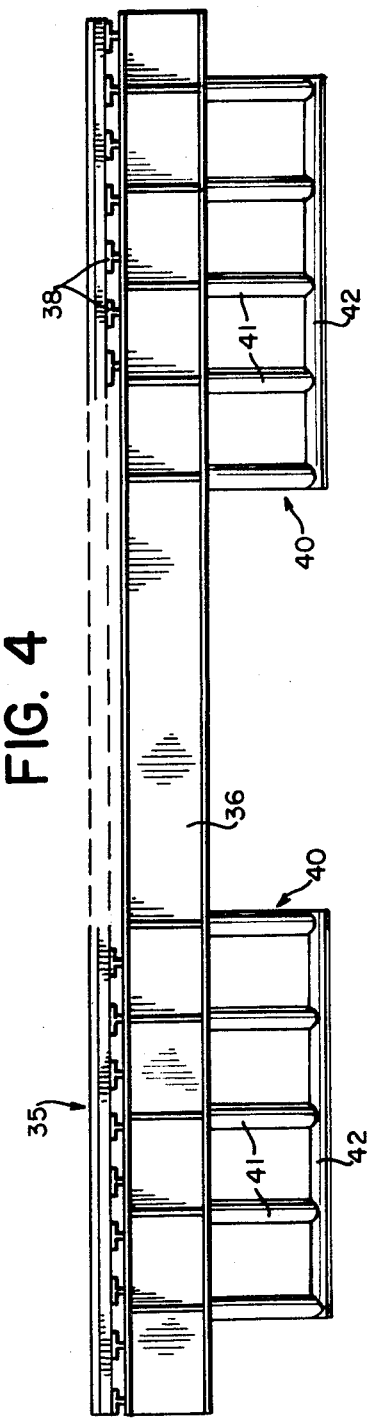

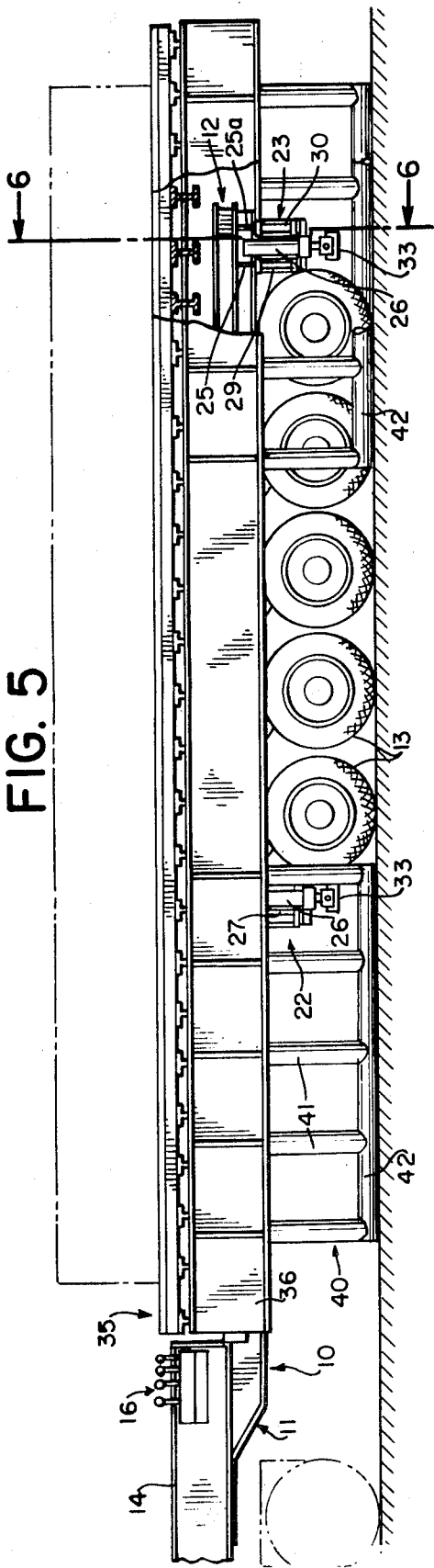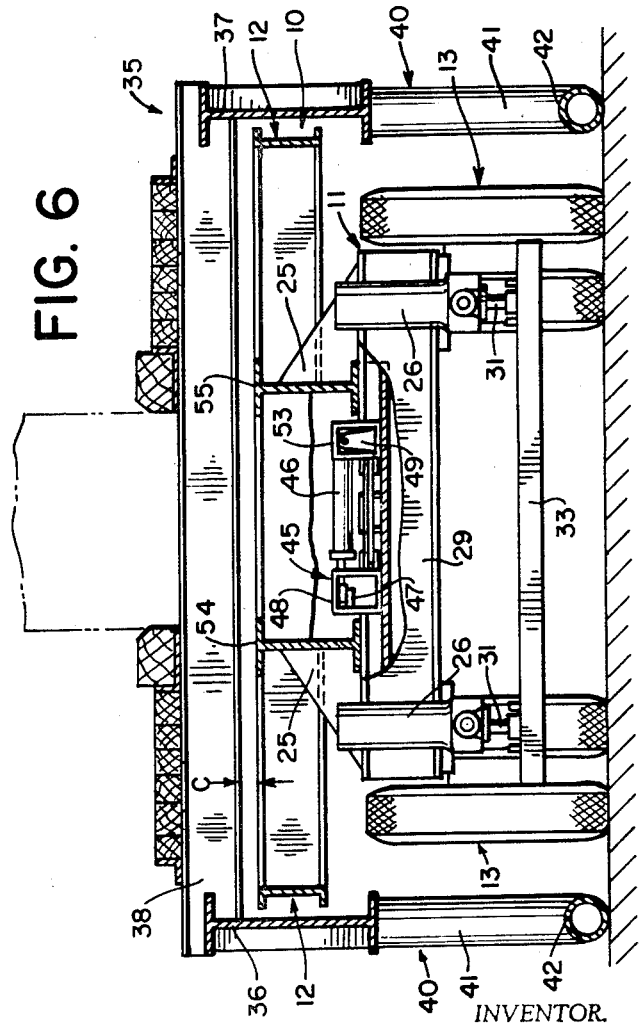

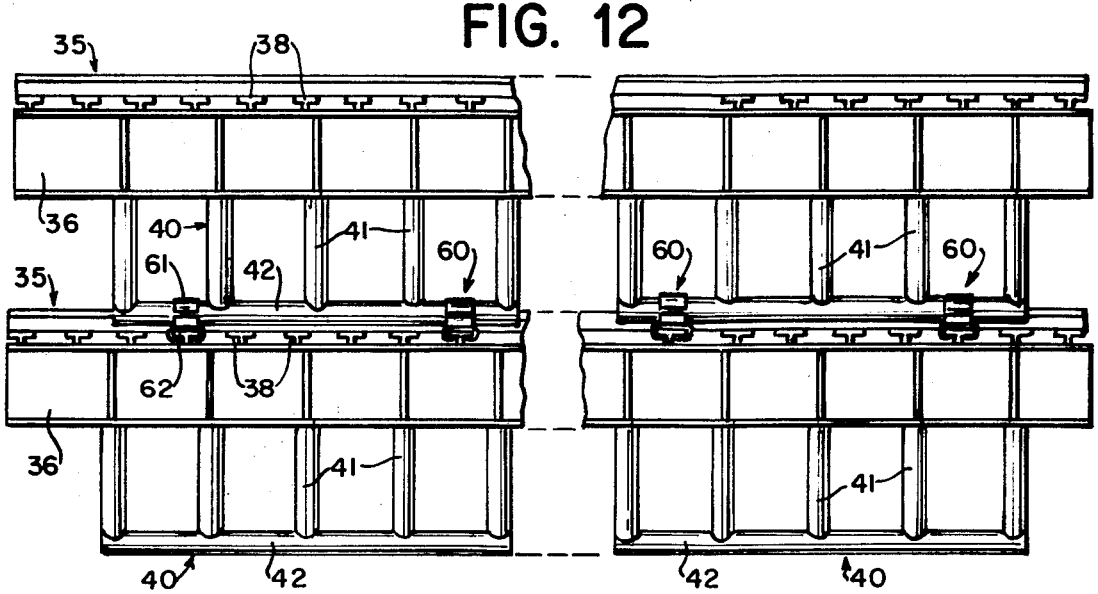
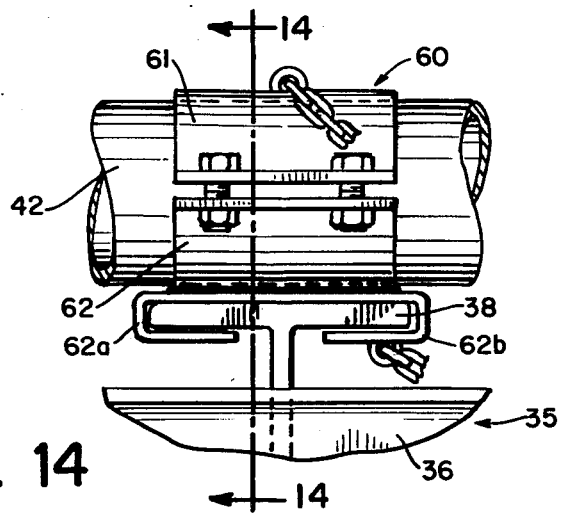
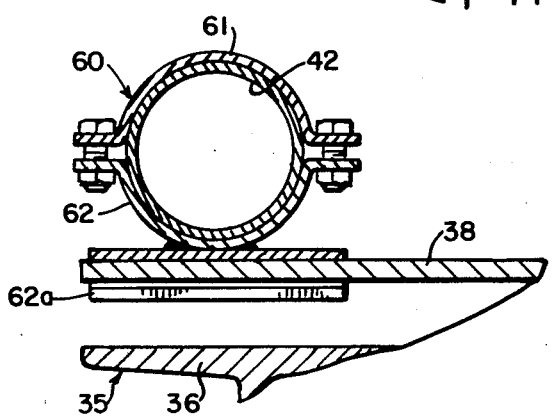

3,737,061

STORAGE UNIT AND TRAILER BODY COMBINATION

BACKGROUND OF THE INVENTION

In conventional truck transport, various tractor bodies can be interchangably hitched to different trailers which are pre-loaded or thereafter loaded with merchandise to be shipped. Frequently it is convenient or essential that a load remain with the trailer in storage for a period of time or that empty trailers be stored to be available for the demands of trucking commerce. This results in the loss of trailer road time and in increased capital investment in trailer inventory which is exceedingly wasteful economically.

It has been proposed heretofore to provide trailer bodies having different kinds of removable load carrying super structures each of which can be stored separately from the mobile trailer chassis. Examples of these are found in U.S. Pat. Nos. 2,925,930 and 3,332,661. Unfortunately none of the several proposed trailer storage unit combinations have been adopted commercially by the trucking industry, largely because the expense of the constructions outweighed projected savings.

It is the purpose of the present invention to obviate these difficulties by providing simplified mechanisms for the transport and removal of a trailer super structure and an inexpensive form of such super structure.

SUMMARY OF THE INVENTION

In accordance with the present invention there is provided in combination, a truck trailer and a storage unit super structure removable therefrom, said unit comprising a frame platform having peripherally dependent along its sides a series of vertical legs to maintain said platform upright in a stored position independent of the trailer body; the trailer body comprising a constant height bed and conventional wheel assembly which mounts a liftable bed superimposed thereon. Means are provided for lifting and positively securing the bed in a raised position after positioning the trailer bed beneath the storage unit whereby the latter may be lifted from the ground for transport. It is a principal feature of the invention that each of the fixed bed, liftable bed, storage unit and securing means cooperate to provide an extremely strong layered load bearing structure.

BRIEF DESCRIPTION OF THE DRAWINGS

FIGS. 3 and 4 are respectively plan and side views of a pallet constructed according to the present invention adapted for transport by the trailer body of FIGS. 1 and 2;

FIG. 5 is a side elevation partially broken away showing the trailer body of FIG. 1 beneath the storage unit of FIG. 3 while the unit remains on the ground;

FIG. 6 is a cross-section taken in the direction of arrows 6—6 of FIG. 5;

FIG. 12 is a fragmentary side elevation of two storage units in vertically stacked relation;

FIG. 13 is a detail of a connection between two storage units in stacked relation; and FIG. 14 is a view taken in the direction of arrows 14—14 of FIG. 13.

DESCRIPTION OF A PREFERRED EMBODIMENT

Figure 1:
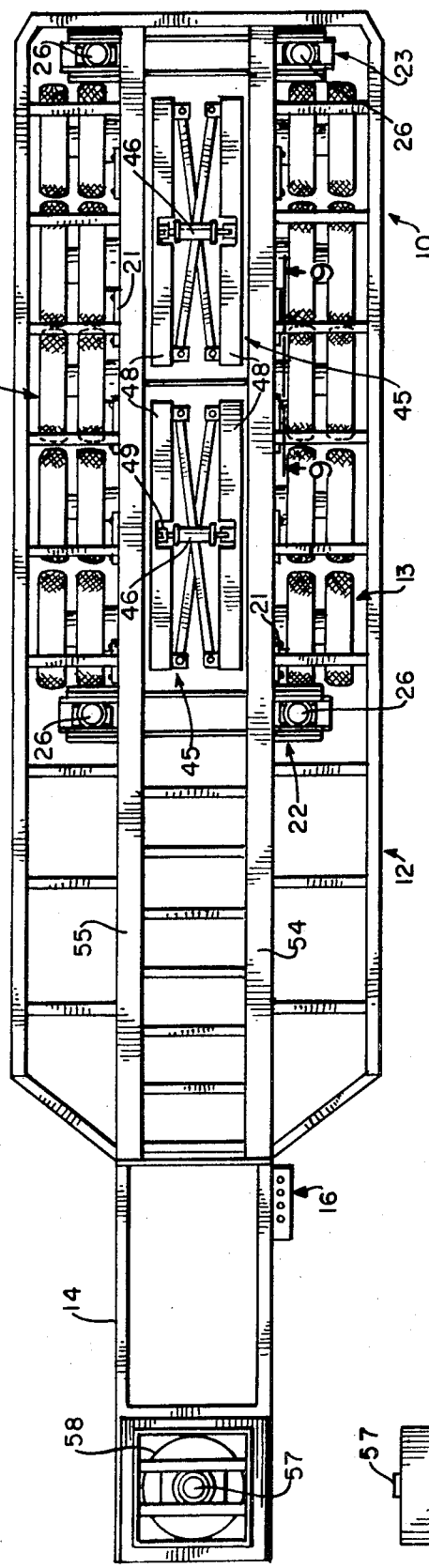
FIGS. 1 and 2 are respectively plan and side views of a trailer body including the liftable bed feature of the present invention.
Figure 2:
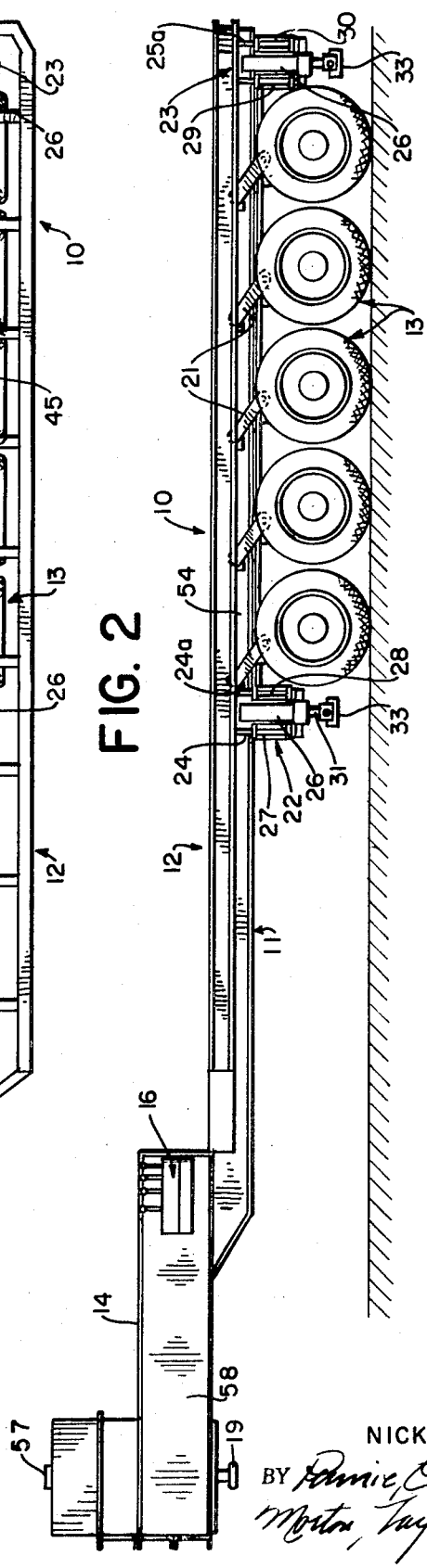

FIGS. 1 and 2 show respectively plan and side elevation views of a truck trailer 10 constructed in accordance with the present invention. The trailer 10 is fabricated of steel beams welded together to form a rigid constant height bed 11 and superimposed thereupon a liftable bed 12. The bed 11 is attached in the conventional manner to a plurality of wheel axles and wheels indicated generally by reference numeral 13. At the forward end, the bed 11 is attached to a welded steel box 14 which will house the hydraulic connections, and a portion of the lines (not shown) necessary to effect operation of various hydraulic actuators to be described. Controls 16 mounted to the box 14 have been illustrated for the control of such actuators.

Immediately forward of the box 14 and secured thereto is an oblong housing 14 for the so called "Fifth Wheel" which is to say the mechanism for attaching the trailer 10 to the hitch plate 17 (FIG. 11) of the truck trailer. The plunger 18 and foot 19 thereof are releasably received with the slot 20 of the hitch plate in the conventional manner.

As will be seen with respect to FIG. 2, the liftable bed 12 is connected to the fixed bed 11 by means of a series of stabilizing arms 21 pivoted to the respective beds at 21a and 21b. Jack combinations 22 and 23 straddle the has 13 forward and rear, and are connected to the liftable bed 12. Each jack combination comprises two hydraulic actuators 26 at each side of the trailer body which are rigidly attached to cross beams 27, 28, 29, 30. These underly the gussets 24, 24a, 25, 25a which are welded to the underside of bed 12. Additionally, the ram or plunger 31 of each actuator 26 is attached to a lower horizontal beam 33.

With reference to FIGS. 3 and 4 a storage unit 35 suitable for transport upon the trailer body of FIG. 1 and 2 has been illustrated. The unit 35 has a load bearing surface or horizontal platform of generally flat rectangular shape, however, it will be appreciated that other designs may be possible included closed body types. In the present instance the storage unit is adapted to receive thereupon bulk goods of various kinds or cargo containers of a size and shape similar to closed trailer body types which would be secured upon the load bearing surface of the storage unit. The unit 35 has two main longitudinal I-beams 36, 37 which supports perpendicularly thereof a series of smaller I-beams 38. In the illustration of FIG. 3, wood planking has been arranged longitudinally upon the cross beam members 38. Depending from each longitudinal beam 36, 37 and at each side are leg sections 40. Each leg section 40 consists of a plurality of vertical legs 41 which are welded at the top to a beam 36 or 37 and at the bottom to horizontal tubular members 42.

Referring to FIGS. 5 and 6, the trailer 10 has been illustrated in position under the horizontal platform section of the storage unit 35. It will be observed that the liftable bed 12 at this time is lower by a distance C (FIG. 6) than the undersurface of cross beams 38 of the storage unit 35 and that therefore the trailer 10 be backed between the leg sections 40 with sufficient vertical clearance provided.

Figure 7:
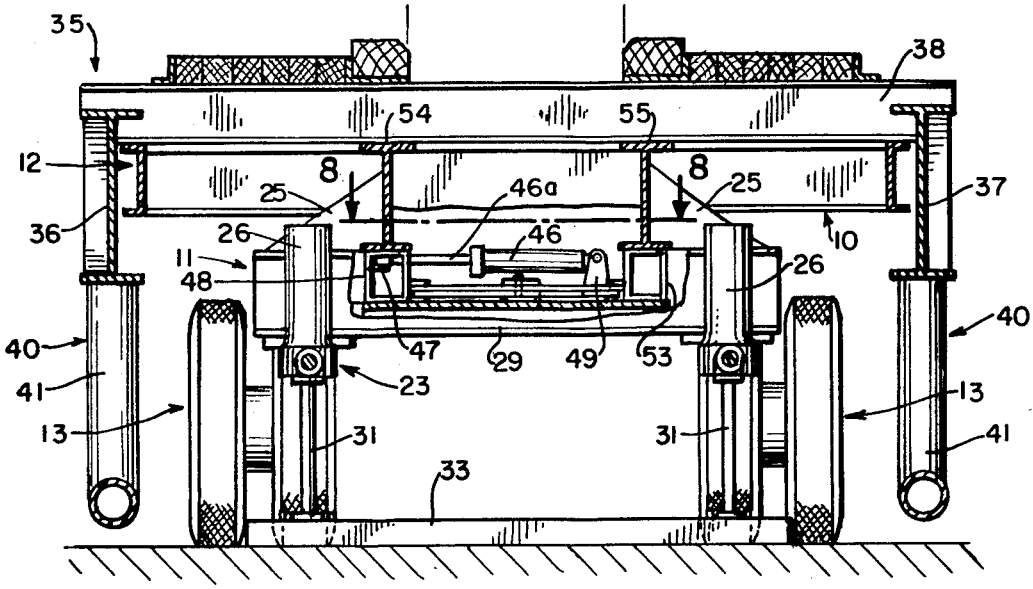
FIG. 7 is a view similar to that of FIG. 6 except that the storage unit has been raised into transport position.
Figure 9:
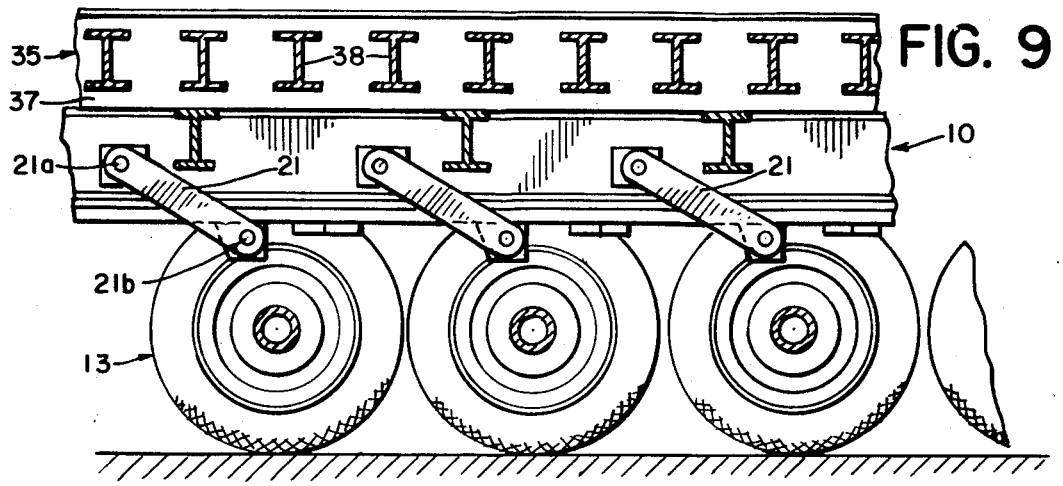
FIGS. 9 and 10 illustrate the sequence of moving the liftable bed portion of the trailer body to its fully raised or transport position.
Figure 10:
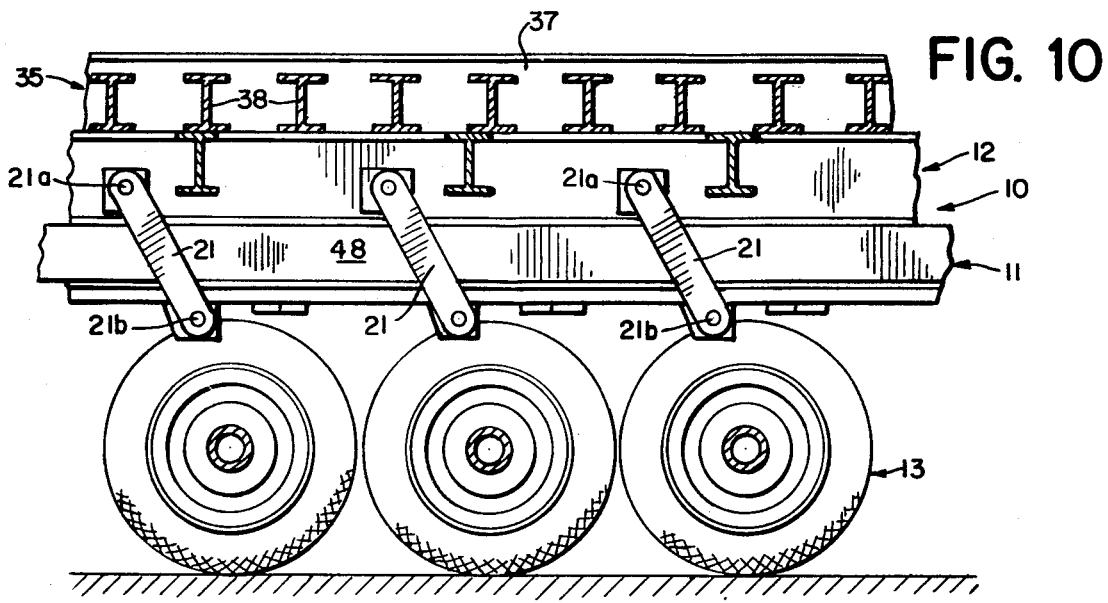

Referring to FIG. 7, it will be seen that when the actuators 26 extend rams 31, the liftable bed 12 will move up against the cross beams 38 of the storage unit 35 to an extent permitted by the counterclockwise movement of the stabilizing arms 21 (see FIGS. 9 and 10). When in this position the leg sections position 40 are clear of the ground for transport.

Figure 8:
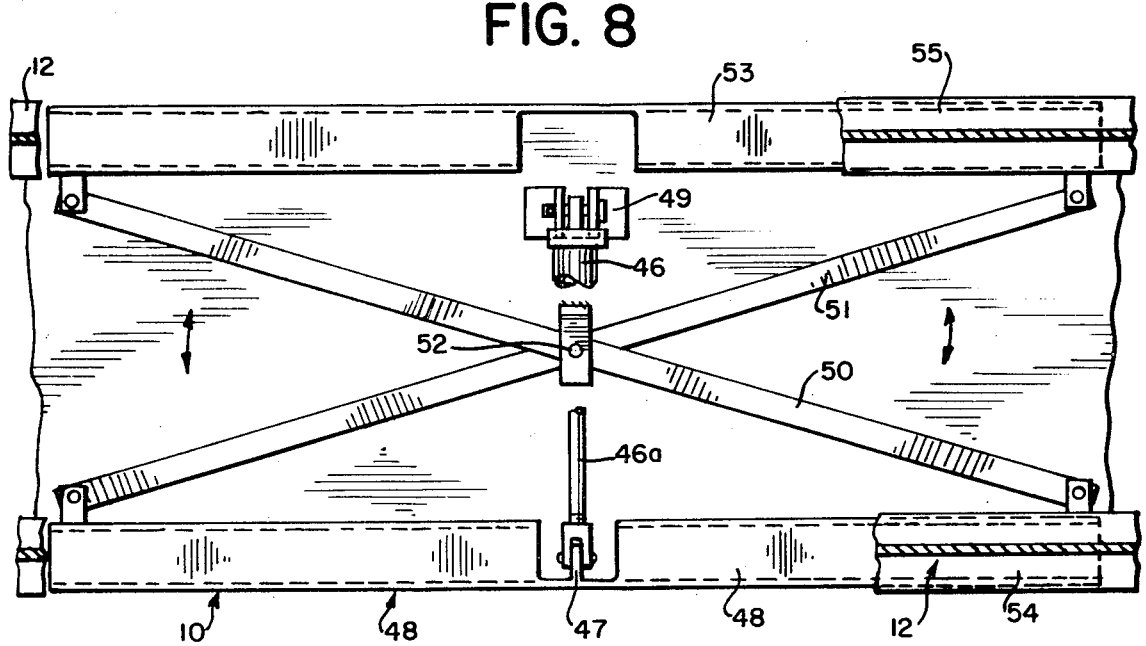
FIG. 8 is a view taken in the direction of arrows 8—8 of FIG. 7.
Figure 11:
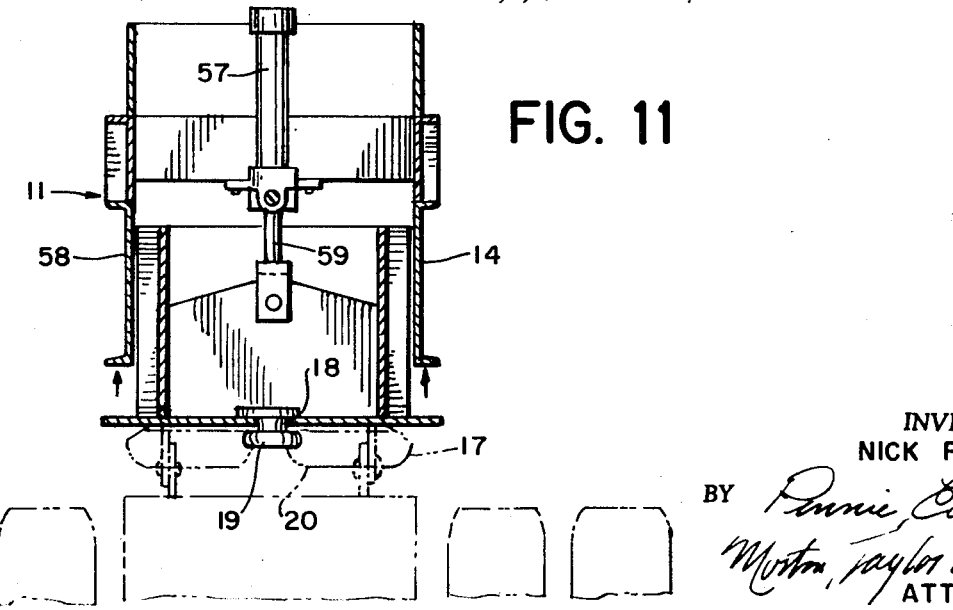
FIG. 11 is a view of the housing accommodating variable lift features of the connection between the trailer body and the tractor.

In order to secure the bed 12 in its raised position, the mechanism 45 shown in FIG. 8 has been provided. Such mechanism consists of an hydraulic actuator 46 whose actuator rod 46a is attached at 47 to one longitudinally extending block beam 48. The other end of the actuator 46 is rigidly attached by means of bracket 49 to the structure of the fixed bed 11. Crossed links 50, 51 joined by pivot pin 52 connect the ends of block beam 48 on the left side of the bed 11 to a similar block beam 53 longitudinally extending along the right side of the bed 11. Thus, extension of actuator rod 46a will result in moving the blocks 48 and 52 laterally outwardly to the position shown in FIG. 7. Each block beam therefore directly underlies a beam 54, 55 which comprise main longitudinal support members of the liftable bed 12. The bed 12 is thus securely maintained in its raised position and a direct, extremely strong horizontal beamed connection is made between the structures of the storage unit 35 and the fixed bed 11. Removal of a unit 35 from the trailer body is simply accomplished by reversing the loading sequence. An operator using controls 16 may also vary the height of fifth wheel housing 15 above the hitch plate 17 (FIG. 11). The pin 18 is affixed to a generally cylindrical section 58 extendable from the housing 17 by energizing an actuator 57 which is connected to section 58 by the cylindrical rod 59.

FIGS. 12-14 illustrate one method and means of stacking storage units 35. As shown, a clamp 60 having upper and lower mating halves 61 and 62 may be attached by its lower section 62 about the upper flanged end of selected cross beans 38 forming the rod bearing section of the storage unit. This section 62 has for this purpose opposing channel-shaped ends 62a, 62b. The upper section 61 is adapted to be bolted about a horizontal member 42 of another storage unit thus effecting vertical stacking of two units. It will be understood that where it may be desirable to separate the units 35 a greater vertical distance than provided by the length of legs 41, that a spacer type coupling would be used to provide greater vertical separation than that of the connector 60.

The particular advantage of the above described arrangement is its great simplicity, economy of construction and strength. Each storage unit is extremely functional and strong and during transport rests securely upon the stacked upper bed, block beams, and lower bed structures. The lifting mechanism and structure of the trailer bed are mechanically quite simple.

It will be understood that the foregoing description is of a preferred embodiment and is therefore representative. In order to fully appreciate the scope of the invention reference should be made to the appended claims.

1. In a truck trailer body having a chassis including wheels and wheel axles, a fixed bed at a constant height relative to said wheels, said bed having hitching means for attachment of said trailer body to a truck tractor, a movable bed superimposed upon said fixed bed, means for lifting said movable bed to a prescribed height above said fixed bed, and a removable load bearing unit superimposed upon said movable bed, the improvement comprising each of said fixed and movable beds and said load bearing unit consisting of horizontal longitudinal and traverse beams forming integrated horizontal platforms nesting in superimposed reinforcing relation upon one another, said bed including vertical rams at each end thereof for lifting said bed and storage unit a predetermined distance above said fixed bed, two spaced longitudinal beams extending lengthwise of said liftable bed forming an integral part of said bed, two box beams extending lengthwise upon said fixed bed intermediate of said liftable bed, link means pivotably connected to each said box beam and power means connected to said link means for simultaneously shifting said box beams laterally beneath the longitudinal beams of said liftable bed in order to retain said liftable bed in a raised position with respect to said fixed bed, said load bearing unit extending laterally beyond said fixed and movable beds, a plurality of vertical legs depending from said unit along the outer periphery thereof, said legs being clear of the ground when said movable bed is in its raised position.

2. The truck trailer body according to claim 1 wherein horizontal tubular members are connected to the lower ends of the vertical legs of said load bearing unit and means for connecting said tubular member of one load bearing unit to the said transverse beams of another load bearing unit in order to stack a plurality of said units.

* * * * *